Figure 1:
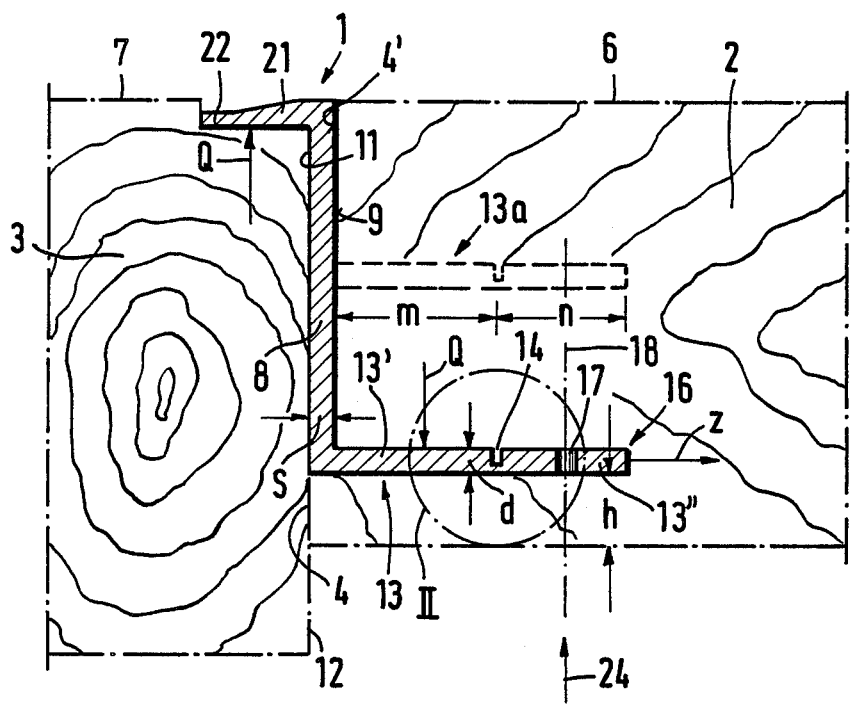

United States Patent [19]

Wilhelmi

[11] Patent Number: 4,711,593

[45] Date of Patent: Dec. 8, 1987

[54] METAL FITTING

[75] Inventor: Juergen Wilhelmi, Syke-Wachendorf, Fed. Rep. of Germany

[73] Assignee: Heinrich Wilhelmi GmbH & Co., Fed. Rep. of Germany

[21] Appl. No.: 822,062

[22] Filed: Jan. 24, 1986

[30] Foreign Application Priority Data

Jan. 24, 1985 [DE] Fed. Rep. of Germany ....... 3502234

[51] Int. Cl.$^4$ .............................................. F16B 7/08
[52] U.S. Cl. .................... 403/187; 403/230; 403/405.1; 403/403
[58] Field of Search .................... 403/232.1, 199, 230, 403/246, 405.1, 403, 187

[56] References Cited

U.S. PATENT DOCUMENTS 1,870,157  8/1932  Williams ........................ 404/403 X
4,280,686  7/1981  Wack ........................... 403/232.1 X

FOREIGN PATENT DOCUMENTS 113892   7/1929  Austria ................................ 403/403
433325   8/1926  Fed. Rep. of Germany ...... 403/403
852144  10/1952  Fed. Rep. of Germany ... 403/405.1
539750   4/1922  France ................................ 403/403

Primary Examiner—Andrew V. Kundrat
Attorney, Agent, or Firm—Hill, Van Santen, Steadman & Simpson

[57] ABSTRACT

A metal fitting for forming an end connection of a wooden beam, such as a roof beam or purlin, to a supporting structure, which may also be a wooden beam, such as a main beam or truss, characterized by a web having opposite bearing surfaces, one bearing surface engaging a surface of the supporting structure and the other surface engaging the end of the beam. The one surface has an arrangement, such as a supporting flange extending perpendicular thereto, for mounting the fitting on the support structure. To mount the beam, the fitting has at least one leg extending perpendicular from the other bearing surface having a constant thickness and being provided with a groove-like attenuation to separate the leg into a supporting portion and a free end portion, which free end portion has openings for receiving fastening elements. The attenuation prevents the transfer of forces extending parallel to the web being applied to the free end portion from being transmitted to the web, but allows tensile forces to be transferred to the web of the fitting.

5 Claims, 2 Drawing Figures

METAL FITTING

The invention relates to a metal fitting for the face-end connection of a wood beam, particularly a connection flush with the upper edge and loadable with transverse forces of a wood beam, for example of a roof beam or of a purlin, to a supporting structure which is also a wood beam. The connection proceeds perpendicularly to said wood beam, for example a main beam or truss, whereby one web of the metal fitting is to have its (first) seating surface seated against the end face of the wood beam and at least one leg of the (first) seating surface projects perpendicular to the direction of force which essentially coincides with the longitudinal direction of the web. This leg is connected to the wood beam, and the free end section of the leg facing away from the web is connected to the wood beam by means of at least one fastening means such as, for example, a nail or a dowel pin which proceeds essentially perpendicular to the leg (and thus essentially parallel to the web. The leg is constructed so that no transverse forces proceeding essentially in web direction (=direction of force) are to be transmitted therewith but only tensile forces proceeding essentially perpendicular to the transverse forces and, thus, essentially in the direction of the leg are transmitted by the leg.

A metal fitting of the species set forth above is known from German Pat. No. 31 30 445. In this known metal fitting, the structure of the free end section of the leg facing away from the web is essentially free of the transmission of transverse force, because the thickness of the leg in the region of the free end section is established (considerably) thinner than in that section of the leg which is immediately proximate to the web.

Over and above this, German Pat. No. 31 30 445 in fact discloses other exemplary embodiments of such a metal fitting in which namely, the leg (legs) is (are) continuously fashioned of identical thickness up to the free end and whereby, for the absorption and transmission of tensile forces, at least one thin, metal fishplate, which is fashioned separately from the leg (legs) and is arranged topically separate, is provided parallel to the leg (legs). This fishplate is connected to or, respectively, anchored in the wood beam. However these further proposed embodiments of German Pat. No. 31 30 445 do not fall within the species of metal fitting under consideration here which has also successfully enjoyed entry on the market in the meantime.

German Pat. No. 31 30 445 in turn departs from a Prior Art as known from the US peridodical *Progressive Architecture*, October 1969, page 250, namely from a metal fitting whose web, which generally proceeds vertically in its installed condition, has its one seating surface—as in the metal fitting of the species—pressing against the face end of the wood beam to be joined, whereby a perforated leg or, respectively, a leg to be perforated which is perpendicular to the web and, thus, horizontal respectively projects both at the upper as well as at the lower end of the metal fitting or, respectively, the web thereof. This web is secured with bolts, screws or the like to a structural part allocated to the wood beam and referred to as supporting structure in the framework of the species set forth above. Thus, in the fittings design already known at that time, the wood beam is pushed between the two horizontal legs up to the seating surface of the web and is secured by means of screws, bolts, pins or the like which respectively extend through holes in the horizontal legs.

In view of the Prior Art already known at that time, German Pat. No. 31 30 445 aptly cites as a disadvantage that, in this Prior Art, both the vertical bearing forces (also referred to as transverse forces above and below) as well as the tensile forces resulting at right angles to the bearing or, respectively, transverse forces which result from the necessarily eccentric force initiation are carried off via the (horizontal) legs which—this being viewed as extremely disadvantageous in German Pat. No. 31 30 445—comprise a constant thickness over their full length. This thickness is prescribed by the bearing forces (=transverse forces) arising after assembly.

German Pat. No. 31 30 445 views the metal fitting known at that time and comprising legs of the same thickness over their full length as also and particularly disadvantageous because the legs comprise identical thickness over their full length defined by the anticipated transvers forces (=bearing forces). This constant thickness, in the opinion of German Pat. No. 31 30 445, requires unnecessary material for the fitting and needlessly increases the weight thereof since the legs must be fashioned significantly longer for the acceptance of anchor screws or the like than would be in fact necessary for absorbing the bearing forces (=transverse forces). As a consequence thereof, citing Column 2, lines 22 ff of German Pat. No. 31 30 445, the bearing pressure point is displaced farther from the seating surface of the web than necessary, and this in turn requires a further (i.e. additional) reinforcement of the legs and their fixing in the web (beyond the dimensioning prescribed by the bearing forces). In the opinion of German Pat. No. 31 30 445, the horizontal legs would thus be lent such thickness that they could only be worked with true metal tools.

Departing on the basis of the Prior Art of the US periodical *Progressive Architecture*, German Pat. No. 31 30 445 states its object as creating a highly loadable and fire resistant metal fitting for the transversely stressable connection to the face end of woods beams which does not suffer from the afore-mentioned, alleged disadvantages and which, in particular, is easy to manufacture and can be secured to the face end of the beam with simple means. This, as stated, has been achieved by the proposal of German Pat. No. 31 30 445 by means of at least one thin metal fishplate parallel to the legs which plate is fixed in the wood beam.

Although it is not contested that German Pat. No. 31 30 445 had created a metal fitting of the species which was advantageously distinguished over the metal fittings known at that time and, consequently, found corresponding acceptance in the market place, it cannot be overlooked that the comments in German Pat. No. 31 30 445 regarding the Prior Art of the US periodical *Progressive Architecture* known at that time and, thus, particularly regarding a fitting for joining wood beams comprising legs of constant thickness are based on false conclusions or, respectively, prejudices of the technical field if it is not only considerations to the Prior Art of the US periodical *Progressive Architecture* which are allowed to enter into an appropriate design evaluation but, over and above this, considerations on which German Pat. No. 31 30 445 happens to be based are, among others, also involved, these, however, having not yet been perceived or, respectively, having been incorrectly evaluated by the appertaining technical field.

In this regard, as an initial consideration, it shall first be pointed out that, as known, it is fundamentally and thus regularly always (considerably) simpler to manufacture any profiles whatsoever having (an at least largely) constant thickness of its individual sections than to manufacture profiles comprising sections of different thickness (particulalry of considerably different thickness). This is true not only of casting processes but is also true, for example, of extrusion molding methods and—even though from completely different points of view—is also particularly true, as known, when, proceeding from greater wall thicknesses, selected sections are to be reworked by machining methods into sections exhibiting lower or smaller wall thickness.

Taking these considerations into account, it would therefore be better per se in terms of production engineering (since it would be substantially more cost-saving) to fashion corresponding component parts—and, thus, the metal fitting under consideration as well—in such fashion or, respectively, to be able to fashion them in such fashion that the individual sections of a metal fitting comprise essentially unchanging wall thickness. Although the point of view of inherently unnecessary materials costs marshalled, among others, in German Pat. No. 31 30 445 is qualitatively true, it, as known, is of far less significance quantitatively in comparison to the manufacturing costs. Further, the processing costs for the incisions of two slots of different widths are higher than the expenditure caused by a uniformly broad slot; particularly since hidden integration is possible with currently available keyway cutters without slot openings having to be subsequently glue-coated.

On the other hand, one must agree with the author of German Pat. No. 31 30 445 that fittings of the US periodical *Progressive Architecture*, i.e. fittings comprising legs having constant thickness, are in fact not optimum, particularly since the displacement of the bearing pressure point cited in German Pat. No. 31 30 445 is reflected, much in the manner of a "feedback", in an additionally required reinforcement of the leg thickness when the fittings are fashioned in accord with the US periodical *Progressive Architecture*.

SUMMARY OF THE INVENTION

The object of the present invention is to improve the metal fitting of the species initially set forth such that, first, it can be manufactured with optimally low manufacturing costs, whereby the afore-mentioned disadvantages cited in German Pat. No. 31 30 445 should nonetheless be avoided, and a new metal fitting is to be created which, in particular, is suitable for a high property class, whereby relatively small dimensions and an improved fire stop are also desired with respect to the new fitting, and, despite the desire for relatively small dimensions, the new fitting should, in particular, also be suitable for relatively heavy wood beams such as, for example, larger-size cemented or laminated wood beams.

The resolution of this object is inventively characterized in that the thickness of the leg measured essentially in the direction of the web (in the way known per se from the US periodical *Progressive Architecture*) is essentially constant, whereby, however, the leg comprises an attenuation at, on the one hand, a distance from the web and at, on the other hand, a distance from its free end, this attenuation acting, so to speak, as an "articulation" between the two sections of the leg and, accordingly, allows only that section of the leg immediately proximate to the web to transmit transverse forces (and, accordingly, moments as well), whereas the free end section of the leg lying beyond the attenuation is not in such a position but absorbes and transmits (essentially only) tensile forces which proceed at right angles to the transverse forces and, thus, to the bearing load.

In a development of the present invention, the inventive attenuation of the leg, which is at least of essentially the same thickness over its full length, can ensue essentially over the full width thereof and, in a specific development thereof, can extend over the full width of the leg. In a meaningful and accordingly expedient fashion, it preferably proceeds from the upper side to the under side of the leg and, in accord with an especially preferred development of the invention herein, can be fashioned as a narrow incision, i.e. as a relatively thin slot or groove, which can be introduced into the at least essentially uniformly thick leg in an effortless fashion as a consequence of the relatively slight quantity of cuttings to be removed and, accordingly, being fashioned therein in a correspondingly cost-saving fashion on the basis of the static calculation to be produced without further ado upon consideration of the anticipated bearing forces.

Obviously, such an embodiment is possible not only given fittings of the invention which are composed of light metal or, respectively, of a light metal alloy but, in particular, is also possible given fittings of steel or the like, i.e. of relatively high-strength materials which require correspondingly smaller dimensions (given the same stresses) as a consequence of their strength value. Dowel pins are provided in accord with the invention as fastening means, particularly for an embodiment composed of steel.

It may be seen without further ado by a person skilled in the art of the appertaining field that two or more legs can also be present given a fitting of the invention.

Another development of the invention is that the fitting includes a bearing leg situated above the support leg with the attenuation. This bearing leg extends in a direction opposite that of the support leg so that the fitting comprises an essentially Z-shaped form and the bearing leg can then be seated, for example, on a main beam, for instance to realize a joining of the appertaining wood beam thereto flush with the upper edge.

Figure 2:
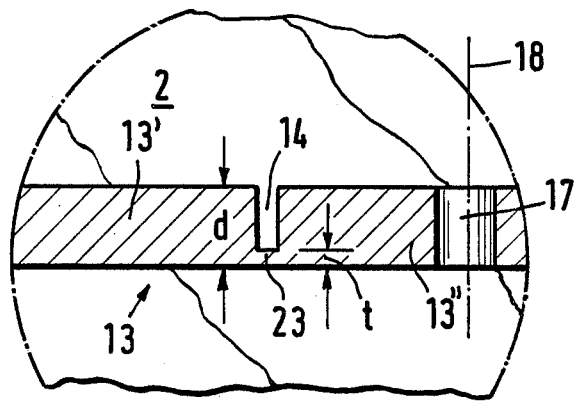

The invention is set forth in greater detail below on the basis of an exemplary embodiment with reference to a drawing. Shown therein are:

FIG. 1 is a cross sectional view through a fitting of the invention with which a roof beam is joined to a main beam, shown in the assembled condition; and FIG. 2 is an enlarged cross sectional view of a portion bounded with a dot-dash circle II of FIG. 1.

The drawing shows a metal fitting referenced 1 overall for joining a wood beam 2 (indicated with a dot-dash line) which is a roof beam to a main beam 3 likewise composed of wood and proceeding at right angles relative to the wood beam 2 and indicated in the drawing with a dot-dash line. The wood beam 2 has its one face or end 4 connected to the main beam 3 with an upper surface 6 of the beam 2 being flush with an upper surface or face 7 of the main beam 3 in FIG. 1. The joint of the wood beam 2 can thereby be stressed with the occurring transverse force Q, as shall be set forth hereinbelow.

In the assembled condition, the metal fitting 1 comprises a vertically proceeding web 8 of a constant wall thickness with opposite seating or bearing surfaces 9 and 11. The wood beam 2 has a recessed or set back face or surface 4' on its end face 4 pressing against one seating surface 9 of the web 8, whereas the other seating surface 11 of the web 8 presses against the one lateral face 12 of the main beam 3, as may be seen from FIG. 1.

The afore-indicated offset of the two faces 4 and 4' of the wood beam derives from the fact that the fitting should not be visible from the underside in the assembled condition. Thus, the face 4' is recessed relative to the surface 4 in accordance with the thickness S of the web 8.

A further or second recess extends perpendicular thereto, namely for the acceptance of a support leg 13 of the metal fitting 1 proceeding at right angles relative to the web 8 which is integrally fashioned with the web 8 and, like the latter, is composed of steel in the exemplary embodiment.

This second recess of the wood beam 2 is also provided, in particular, to render the fitting 1 unseen from below below. This is obviously the case in the illustrated exemplary embodiment since wood material having the thickness h is still located below the leg 13.

As may be seen from the drawing, the thickness d of the leg 13 is constant with the exception of an attenuation 14 fashioned as a slot-shaped, narrow incision or groove which is situated at, on the one hand, a distance m from the seating surface 9 of the web 8 and, on the other hand, at a distance n from the free end 16 of the web 8. The attenuation 14 separates the leg 13 into a proximal section 13' adjacent the web 8 and a free end section 13" which has bores 17 for the acceptance of fastening means which are preferably composed of steel dowels in the present case and are only indicated in the drawing in terms of their longitudinal axis 18.

Because of the attenuations 14, only the proximal section 13' of the leg 13 will accept applied loads or transverse forces Q over the length m and transmit them to the web 8. The free end section 13", with yield to the transverse forces Q, but will transmit tensile stresses or forces Z through a remaining portion or connecting section 23 (FIG. 2) below the groove 14 to the section 13' and web 8. Thus, tensile forces Z, which are transferred from the beam 2 through the fastener in bores 17 of the section 13" will be transmitted to the web 8.

For the sake of completeness, let it also be pointed out that, over and above this, the metal fitting 1 also comprises a bearing leg 21 which—like the leg 13—extends horizontally in the assembled condition and, thus, perpendicular to the web 8 but in the opposite direction. The leg 21 rests on the main beam 3 and preferably in a recess 22 of the main beam 3. The length of the recess 22 corresponds to the length of the bearing leg 21 and the depth of the recess 22 corresponds to the greatest thickness of the bearing leg 21 which greatest thickness is situated at that end of the bearing leg 21 proximate to the web.

The preparation of the wood beams 2,3 should be clear without further ado for a person skilled in the appertaining art, at least given knowledge of the above statements and looking at the attached drawing, particularly since this is fundamentally known in very similar fashion from German Pat. No. 31 30 445. What is new is that because of the constant cross section of the leg 13, the second recess for the leg 13 is formed in the beam 2 with a constant cross section and is, thus, substantially easier to produce than the recess for the comparable metal fitting of German Pat. No. 31 30 445.

Although the leg 13 comprises a constant thickness d over its full length (m+n), and is thus also particularly easy to manufacture in turn (this being true, moreover, for the overall metal fitting 1 since this, as may be seen, comprises a nearly constant wall thickness), and although the metal fitting or, respectively, the leg 13 thereof is likewise definitely not in need of any metal-cutting processing and/or tools fashioned in an appropriately stepped way, the alleged, significant disadvantages cited in German Pat. No. 31 30 445 (v., in particular, Col. 2) obviously do not occur. With a constant thickness for the leg 13, the bearing pressure point, for example, is displaced farther away from the seating surface 9 of the web 8 than necessary (and under these conditions, would have to lead to a necessary reinforcement of the leg 13 including its connection to the web 8 as a consequence of the greater bending moment stress applied thereto. However, the attenuation 14 provided as a thin, slot-like incision between the two sections 13' and 13" of the leg 13 prevent this displacement from occurring. For the remaining connecting section 23 between the two leg sections 13' and 13" whose height t is dimensioned such that the occurring tensile stresses Z can be transmitted within the bounds of allowable stress limits acts, so to speak, as an articulation between the two leg sections 13', 13" with respect to the occurring transverse forces. Thus, no moments are transmitted via this articulation, so that the occurring bearing loads or, respectively, the transverse forces deriving therefrom are carried out practically only via the leg section 13' and the leg section 13" essentially serves only for transferring the tensile stress Z. To this end, as already set forth, the leg section 13" is provided with at least one bore 17 (a plurality thereof in the illustrated exemplary embodiment) into which a steel dowel is driven in the direction of the arrow 24, i.e. proceeding from below, so that a gripping of the wood beam 2 is assured in addition to the occurring friction, etc., and the occurring tensile stresses Z can be absorbed and transmitted.

In comparison to the metal fittings known from German Pat. No. 31 30 445, the metal fitting of the invention definitely exhibits the same functional advantages and, over and above this, exhibits further advantages, particularly from the viewpoint of production engineering, which have already been set forth in part above, whereas the disadvantages surmised within the framework of an obvious prejudice in the technical field given such fittings comprising a leg of uniform thickness are in fact not present as a consequence of the "trick" of the invention of creating an attenuation 14 or, respectively, are thereby suppressed.

When, as in the exemplary embodiment shown, the metal fitting of the invention is not composed of a light metal such as, for example, aluminum or, respectively, an aluminum alloy, then, not only can corresponding, relatively small dimensions be realized therewith, but a fire stop considerably more effective in comparison to aluminum fittings or the like can be realized therewith. In particular, such a fitting of the invention can be employed even for the highest property classes and, for example, is also employable when a heavy cemented or laminated wood beam is to be joined to a corresponding supporting structure.

The attenuation 14 of the invention need not necessarily extend over the full width of the fitting 1 measured prependicular to the plane of the drawing, yet this comprises a preferred embodiment—if only for production-associated reasons, among others.

Let it also be pointed out that a metal fitting 1 of the invention can, obviously, fundamentally comprise more than one leg 13. Thus, for instance, a second leg 13a indicated with broken lines in FIG. 1 which, given the illustrated exemplary embodiment, is fashioned in the same way as the leg 13 and proceeds parallel thereto at a distance thereabove. The second leg 13a is then likewise received in a third recess in the wood beam 2 in order to thus be able to absorb and carry off correspondingly high applied loads without having to undertake a corresponding boost in the wall thickness of the leg 13.

As already indicated, the overall metal fitting 1 can be essentially or completely embedded into the wood of the wood supports 2,3 and, accordingly, can also be narrower than the wood beam 2, as may be seen by a person skilled in the art without further ado.

The connection of the metal fitting 1 to the main beam 3 or the like need not, obviously, ensue such as in the exemplary embodiment shown in the drawing, i.e. by means of one (or more) bearing legs 21. Instead a toothing, hook-like tines or the like can be present on the seating surface 11, which lies opposite the seating surface 9. The metal fitting 1 can be positively locked by the tines to the main beam 3 or, respectively, to a structural part connected to the main beam 3 and preferably composed of metal, for example, steel.

I claim:

1. A metal fitting for an end connection of a wood beam to a perpendicularly extending supporting structure, said fitting including: a web to be arranged between said end of said wood beam and said supporting structure; a supporting flange at an upper end of said web extending perpendicular to said web, said supporting flange to be received on the supporting structure; and at least one leg extending in an opposite direction to said supporting flange from the web, said leg being connectable at its free end portion to said wood beam by at least one fastening means extending perpendicularly to said leg, said leg having an upper surface being provided with a groove-like attenuation between said web and said fastening means, said attenuation extending over the full width of said leg and parallel to the web.

2. A metal fitting according to claim 1, wherein the fastening means is a steel dowel.

3. A metal fitting in accordance to claim 1, which has at least two legs extending parallel to each other.

4. In a metal fitting for use in forming an end connection between an end of a wooden beam to a perpendicularly extending supporting structure, said metal fitting having a web with opposite bearing surfaces, one of said bearing surfaces being provided with means for securing the fitting to the supporting structure and the other surface having at least one leg extending perpendicular to the plane of said other surface, said leg being adapted to be received in a slot formed in the end of the beam and having at least one aperture adjacent a free end of the leg for receiving fastening means for securing the beam to said leg, the improvements comprising the leg having a constant thickness along its length and a groove-like attenuation spaced inward from the apertures to provide a support portion and a free end portion for the leg, so that the application of loads extending parallel to the web are only transferred to the leg by the support portion and the free end portion only transfers tensile forces to the web.

5. In a metal fitting according to claim 4, wherein the means for securing the web to the support beam structure includes a support flange extending perpendicular from the one bearing surface.

* * * * *